Figure 1:
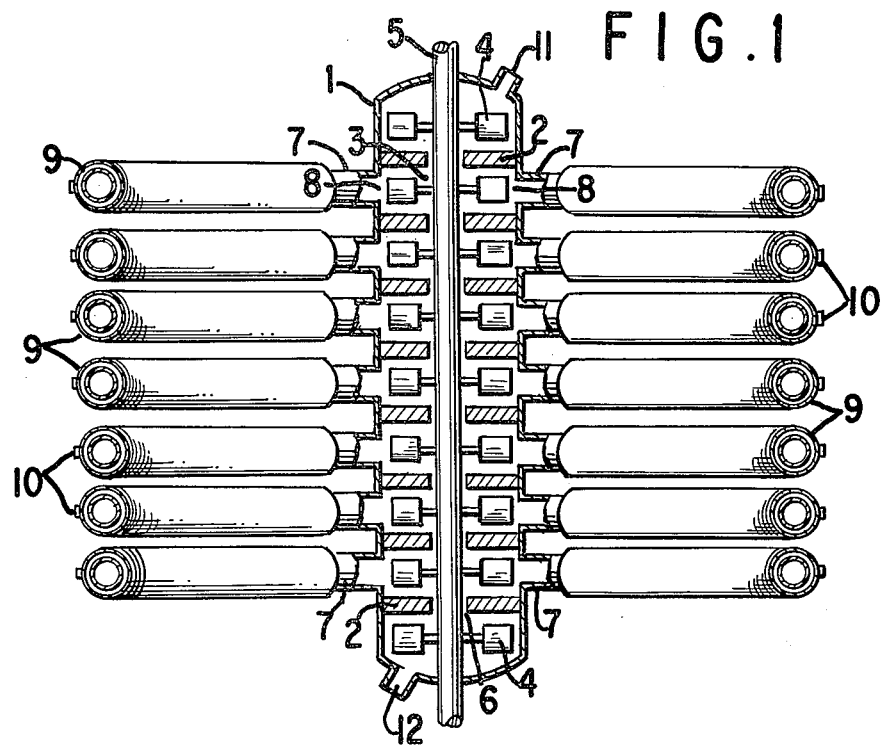

United States Patent [19]
Wolf et al.

[11] 3,950,138
[45] Apr. 13, 1976

[54] APPARATUS FOR CONDUCTING CHEMICAL REACTIONS, PARTICULARLY POLYMERIZATION, CONTINUOUSLY

[75] Inventors: Axel Wolf; Ulrich Goetze, both of Cologne, Germany

[73] Assignee: Wacker-Chemie GmbH, Munich, Germany

[22] Filed: Aug. 28, 1974

[21] Appl. No.: 501,150

[30] Foreign Application Priority Data
Aug. 30, 1973  Germany............................ 2343788

[52] U.S. Cl. .................... 23/283; 23/284; 23/285; 23/288 E; 23/288 H; 165/109; 165/120; 165/143
[51] Int. Cl.² .... B01J 1/00; B01J 8/00; F28D 15/00
[58] Field of Search ......... 23/283, 284, 285, 288 H, 23/288 E, 288 K; 165/120, 143, 109

[56] References Cited
UNITED STATES PATENTS
3,150,934  9/1964  Hazard.............................. 23/285 X
3,871,445  3/1975  Wanka et al..................... 23/288 M Primary Examiner—Joseph Scovronek
Assistant Examiner—Barry I. Hollander
Attorney, Agent, or Firm—Hammond & Littell

[57] ABSTRACT

An apparatus for carrying out chemical reactions in a continuous manner, particularly polymerizations, comprising a substantially axially symmetrical central reaction chamber containing a plurality of vertically spaced substantially axially symmetrical separators dividing said central reaction chamber into a plurality of compartments, a rotatable shaft extending perpendicularly to said separators through each of said separators adapted to mount agitator blades therein for each of said plurality of compartments, means to rotate said rotatable shaft, openings in said separators adapted to allow a restricted flow of liquid between said plurality of compartments, a plurality of ring-shaped conduits, each in communication with one of said plurality of compartments by two unrestricted openings therein, and openings in the topmost and bottommost of said plurality of compartments and in said ring-shaped conduits adapted to receive and dispense fluids; as well as a method of continuous suspension polymerization of vinyl monomers in the presence of water and an oil-soluble free-radical polymerization catalyst utilizing the said apparatus.

8 Claims, 2 Drawing Figures

U.S. Patent   April 13, 1976   3,950,138

APPARATUS FOR CONDUCTING CHEMICAL REACTIONS, PARTICULARLY POLYMERIZATION, CONTINUOUSLY

THE PRIOR ART

The great need for chemical products, for example, plastics, makes it necessary to look for more economical apparatus and procedures for the known production methods. Two basic principles which lead to an improvement in this direction are, on the one hand, the use of large reaction volumes and, on the other hand, an operation of the process in continuous apparatus which permits a high space-time output.

In the presently known methods and apparatus, only one of these factors has always been improved. German patent application (DOS) 2,032,700 describes a large autoclave of over 90 cubic meters for the polymerization of ethylenically-unsaturated monomers. Such a large autoclave, however, has an unfavorable ratio of cooling surface to total volume. As a result, brine must be used as a cooling agent in order to avoid long reaction times. The use of brine means higher costs, however, and in addition a greater safety risk, since the polymerization can run away if the cooling system fails. For autoclaves of this size a computer is frequently necessary to control the elimination of heat. Besides, a continuous reaction process is not possible in such large batch apparatus.

German Pat. No. 1,217,069, on the other hand, describes an apparatus in which continuous polymerizations can be conducted in principle. However, this apparatus does not permit the use of large reaction volumes while maintaining the usual reaction times, since the elimination of heat in controlled form is only possible by jacket cooling. This means that an increase of the space-time output beyond the usual extent is not possible.

OBJECTS OF THE INVENTION

An object of the invention is therefore to provide an apparatus which permits continuous chemical reactions, particularly polymerizations, where rapid elimination of the reaction heat must be possible in order to achieve a decisive increase of the space-time output. Furthermore, the apparatus should also be suitable for the suspension-polymerization of vinyl chloride, where additional steps are necessary to avoid large deposits of polyvinyl chloride.

Another object of the present invention is the development of an apparatus for conducting chemical reactions, particularly polymerizations, continuously comprising a substantially axially symmetrical central reaction chamber containing a plurality of vertically spaced substantially axially symmetrical separators dividing said central reaction chamber into a plurality of compartments, a rotatable shaft extending perpendicularly to said separators through each of said separators adapted to mount agitator blades thereon for each of said plurality of compartments, means to rotate said rotatable shaft, openings in said separators adapted to allow a restricted flow of liquid between said plurality of compartments, a plurality of ring-shaped conduits, each in communication with one of said plurality of compartments by two unrestricted openings therein, and openings in the topmost and bottommost of said plurality of compartments and in said ringshaped conduits adapted to receive and dispense fluids.

A further object of the present invention is the development of a continuous process for the suspension polymerization of vinyl monomers utilizing the above apparatus.

These and other objects of the present invention will become more apparent as the description thereof proceeds.

THE DRAWINGS

Figure 2:
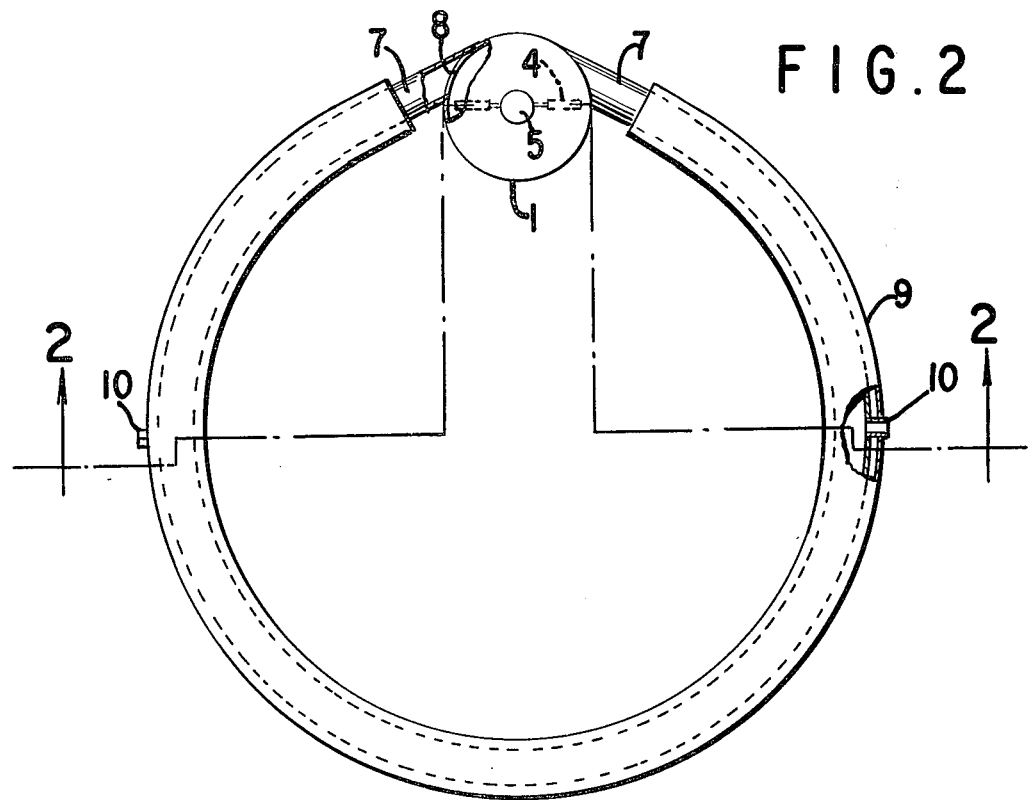

FIG. 1 is a cross-sectional view of the apparatus of the invention, and FIG. 2 is a cross-section view from the top.

DESCRIPTION OF THE INVENTION

The drawbacks of the prior art have been overcome and the above objects have been achieved by the development of an apparatus for conducting chemical reactions, particularly polymerizations, continuously comprising a substantially axially symmetrical central reaction chamber containing a plurality of vertically spaced substantially axially symmetrical separators dividing said central reaction chamber into a plurality of compartments, a rotatable shaft extending perpendicularly to said separators through each of said separators adapted to mount agitator blades thereon for each of said plurality of compartments, means to rotate said rotatable shaft, openings in said separators adapted to allow a restricted flow of liquid between said plurality of compartments, a plurality of ring-shaped conduits, each in communication with one of said plurality of compartments by two unrestricted openings thereon, and openings in the topmost and bottommost of said plurality of compartments and in said ring-shaped conduits adapted to receive and dispense fluids.

With reference to the drawings, the subject of the invention is an apparatus that permits continuous chemical reactions, particularly polymerizations of olefinically-unsaturated monomers, consisting of a substantially axially symmetrical, central reaction chamber 1 which is subdivided by substantially axially symmetrical separators 2 into compartments 3 in which stirrers 4 are optionally arranged. These stirrers 4 are all secured on a common shaft 5 extending perpendicularly to the separators 2, the compartments 3 being in communication with each other through openings 6 in the separators 2, and ring conduits 7, supplied for all but the top and bottom compartments 3, each of which is connected to a compartment 3 by two openings 8.

The apparatus according to the invention is designed to carry out exothermic reactions rapidly in a continuous manner. This is possible particularly because the heat developed can be eliminated rapidly by the special design of the apparatus and of the stirrers. Naturally, it is also possible in principle to work intermittently or batchwise employing the above described apparatus.

The apparatus is suitable for a number of chemical reactions in the liquid phase; however, these should be such that there is no substantial deposits from the liquid phase on the reactor walls, since this would disturb the continuous realization of the reaction (limitation of the heat transfer and/or impairment of the product quality).

Examples of such reactions are polycondensation, esterification, saponification or precipitation reactions. The apparatus is particularly suitable for the polymerization and copolymerization of olefinically-unsaturated monomers, such as olefins, like ethylene, acrylic and methacrylic acid compounds, styrene and its derivatives, furmaric and maleic acid esters, vinyl esters, particularly vinyl halides, like vinyl chloride and mixtures thereof.

More particularly, the following olefinically-unsaturated monomers selected from the group consists of olefins having from 2 to 12 carbon atoms, acrylic acid, acrylonitrile, acrylamide, lower alkyl acrylates, methacrylic acid, methacrylonitrile, methacrylamide, lower alkyl methacrylates, styrene, lower alkylstyrene, lower alkyl fumarates, lower alkyl maleates, vinyl halides, vinyl alkanoates having from 1 to 18 carbon atoms in the acid moiety, vinylidene chloride, and mixtures thereof, may be employed in polymerization and copolymerization reactions. The polymerization can be an emulsion polymerization, a suspension polymerization, a solution polymerization, or a bulk polymerization. The apparatus is particularly suitable for the suspension polymerization of vinyl chloride, optionally, together with other olefinically-unsaturated monomers.

The apparatus according to the invention consists of a central reaction chamber 1 and of ring conduits 7 arranged thereon. The total volume of the reaction chambers of the apparatus is preferably from 10 to 100 cubic meters, of which generally only a smaller portion is provided by the central reaction chamber. The volume of the ring conduits is usually from 50% to 90% of the total volume. The central reaction chamber can have an axially symmetrical form, or any other substantially axially symmetrical form, for example, an elliptic form. The separators 2 are shaped accordingly. These can be designed, for example, as disks or cones.

One or several openings 11 and 12 are provided in the central reaction chamber at the top and bottom, through which the substances to be reacted are introduced or the end products are removed. Principally, the apparatus can be operated with a flow from the top to the bottom, as well as from the bottom to the top. But the operation from the top down is preferred.

In the separators 2 are provided openings 6 so that the compartments 3 formed by them are connected with each other and a flow of the reaction mixture from one chamber to another is made possible. The openings can have different forms. In general, they are kept small, to permit only one main direction of flow and to avoid remixing. The separators 2 can be secured, for example, on the stirring shaft 5 and a ring slot can be left open toward the wall of the central reaction chamber. A relatively large gap is formed in this case, and in addition the separators are turned with the rotating shaft. The separators are preferably secured liquidtight on the walls of the central reaction chamber and the openings in the separators result as a ring slot between the stirring shaft and the separators. The ring slot is thus substantially smaller, since it only needs room for the rotating shaft and some free space required for the passage of the reaction mixture. An advantageous result is that there is no remixing and a narrow spectrum of stay in the reactor can be achieved, which is necessary in many cases to obtain a good quality product. The quality thus obtained is more constant than in products which originate from several charges in an intermittent or batch reaction. It is also possible to use separators with different openings and to conduct the shaft by means of packings through the separators, but the technical expenditure is much higher.

The shaft 5 can extend centrically or eccentrically through the central reaction chamber. In general, stirrers 4 are provided on the shaft in each compartment. The type of stirrer depends on the reaction conditions, so that blade, vane, impeller or propeller stirrers, etc. can be used. For the polymerization of vinyl chloride in suspension, a combination of vane and propeller stirrers is particularly effective. In the simplest case the drive shaft itself serves as a stirrer. The stirrers produce vigorous mixing and a high velocity of flow in the ring conduits in those instances where the latter are connected to the respective compartment. This is of advantage in order to avoid deposits of the products formed.

The ring conduits are relatively large, compared to the central reaction chamber (they can vary in size among each other), so that a major part of the reaction mixture is contained in the ring conduits. The ring conduits can have a diameter which is the height of the compartments or is less, or, they can be arranged at different levels on the compartment. The openings 8 for their connection to the compartments are always substantially on the opposite sides of the compartment. The connection is usually effected tangentially in the direction of rotation to the stirrer.

The number of compartments can be selected at random, based on the consideration as to what number is feasible for the corresponding reaction. In general, all compartments have a ring conduit, with the exception of the topmost compartment (for the mixing of the reaction components) and the bottommost compartment (for the withdrawing of the reaction products). Between these two compartments it is not feasible to provide less than three stages (compartments plus ring conduit). Preferably 5 to 30 stages are frequently provided. For over 30 stages the technical expenditure seems no longer justified in most cases, except if special problems have to be solved.

The ring conduit has an extremely favorable influence on the ratio of reactor contents to cooling surface. Compared to conventional reaction vessels, a 15-fold to 30-fold improvement can be achieved. The cooling is preferably effected by designing the ring conduits as jacketed ring conduits, so that they can be charged with a cooling medium. The ring conduits need not be equipped, however, completely with a jacketed cooling pipe, frequently a portion suffices, unless the reactions are particularly highly exothermic. The central reaction chamber can likewise be jacketed. Water is generally used as a cooling medium. Several stages, for example, are mostly controlled together by a thermostat. But each stage can also be controlled by thermostat by itself. Different temperatures can be used in the individual stages. The regulation of cooling can be effected with simple regulating means. Furthermore, it is possible to eliminate the heat of reaction completely or partially by open-surface cooling over the ring conduits.

The invention will be described more fully on the basis of an embodiment represented in the drawings of FIGS. 1 and 2.

The apparatus comprises the central reaction chamber 1 and the separators 2 which divide it into the compartments 3. The stirrers 4, in the present case blade stirrers, are secured on the shaft 5. The openings 6 serve for the passage of the reaction product into the next compartment. The ring conduits 7 are shown in the drawings, as well as the opening 8 in the compartments 3 to the ring conduits 7. The cooling jacket 9 surrounds the ring conduits 7 and additional openings 10 for dosing auxiliary substances or reaction components are shown. The inlet and outlet openings 11 and 12 are at the top and bottom compartments 3.

The entire apparatus is generally made of refined steel. Care should be taken that the inner surfaces are very smooth to avoid sites for deposits.

The apparatus according to the invention is particularly suitable for the suspension polymerization of vinyl chloride or for the copolymerization of vinyl chloride with other olefinically-unsaturated monomers in the aqueous phase in the presence of oil-soluble free-radical-former polymerization catalysts, protective colloids and/or emulsifiers and, optionally, other polymerization aids. Care must be taken that no deposits of PVC are formed in the autoclave. Several polymerization methods are known from the state of the art which avoid this. Preferably, the following measures are used:

1. A material is used for the manufacture of the apparatus which has an average surface roughness of less than 10 $\mu$, preferably less than 1 $\mu$.

2. A velocity of flow of the water of at least 0.3 m/sec, preferably 1 to 2 m/sec is maintained in the apparatus. This is readily possible in the apparatus according to the invention, since only the stirrers and the stirring speed have to be designed accordingly.

3. A water-soluble reducing agent is used in an amount of 2 to 2000 ppm, preferably 10 to 300 ppm.

These measures are described in detail in U.S. patent application Ser. No. 338,840, filed Mar. 7, 1973.

For the suspension polymerization this apparatus represents a particular progress, because only batch polymerization was possible heretofore in practice, and now there is a possibility for a continuous operation. Furthermore, due to the large specific cooling surface, the polymerization can be effected very rapidly without any safety risk, even in extremely large plants. Thus the theoretical reaction time of 1 hour can be achieved in practice in 2 to 3 hours with conventional catalysts, with a K-value of the end product of 70. With lower K-values, the reaction time can be further decreased. The results are much higher space-time outputs, for example, 100 monthly tons per cubic meter, compared to 15 monthly tons per cubic meter in a batch operation. The investment costs are correspondingly lower, so that a particularly economical production method of the polyvinyl chlorides is ensured.

Furthermore, the continuous operation results in a more uniform product quality. In a discontinuous production, however, every batch is slightly different. Another advantage is the reduced requirement for personnel. The reactor requires no attendance during operation and can be monitored from a control room. The operations, like filling, distilling, draining and particularly cleaning, necessary in batch operations, which require usually manual work, are not necessary here or only during the starting and stopping of the plant.

The present invention, therefore, also involves a continuous process for the production of polyvinyl chlorides which consists essentially of the steps of continuously charging an aqueous phase containing water, water-dispersible suspension aids selected from the group consisting of protective colloids, emulsifiers and mixtures thereof and from 2 to 2000 ppm of a water-soluble reducing agent into a confined area under agitation, continuously charging an organic phase containing a vinyl monomer selected from the group consisting of vinyl chloride and mixtures of vinyl chloride with up to 20% by weight of an olefinically-unsaturated monomer copolymerizable with vinyl chloride, and an oil-soluble free-radical-forming polymerization catalyst, into said agitated aqueous phase, continuously flowing said agitated mixture through a series of interconnected flow circuits at a flow rate of at least 0.3 meters/second, maintaining said flow of said agitated mixture for a time and at a temperature sufficient to effect polymerization and continuously withdrawing a polymerized suspension of vinyl monomers at a rate comparable to the rate of the continuous charging.

The auxiliary substances generally used in the suspension polymerization, like oil-soluble catalysts, emulsifiers, protective colloids, buffer substances and regulators, are used in the usual amounts, as described in U.S. patent application Ser. No. 338,840. The water/vinyl chloride ratio corresponds likewise to the known values. The pressure is mostly maintained at 1 to 15 atm. gauge; however, for gaseous comonomers up to 100 atm. gauge can be employed. The temperature is generally maintained at 30°C to 80°C. The continuously supplied reaction components and the reaction medium (mostly water) are preferably heated first by a heat exchanger to the desired temperature.

In general, cleaning of the apparatus is not necessary, but for safety reasons the reactor can be shut off in certain time intervals and be cleaned with a solvent, for example, tetrahydrofuran. Though the formation of wall deposits is not likely in normal operation, some deposits may be formed occasionally at particularly critical spots by some kind of trouble or by contaminated vinyl chloride. Since a visual inspection is much more cumbersome and time-consuming than rinsing with solvents, the latter operation is preferably carried out routinely. Since the service life of the reactor is several weeks, these operations have hardly any effect on the output.

The suspensions obtained with the apparatus according to the invention can be worked up in known manner, for example, by separating the water of polymerization, subsequent washing and drying.

The following examples are illustrative of the invention without being limitative thereof in any respect.

EXAMPLE 1

An apparatus corresponding to the preceding description and drawings, with a total of 20 stages and an average surface roughness of the walls of less than 1 $\mu$ was utilized. 41 parts (parts by weight) of vinyl chloride, 58 parts of deionized water, 0.06 parts of a partly saponified polyvinyl acetate (40% residual acetate), 0.04 parts of diethylhexyl percarbonate, 0.01 parts of sodium bicarbonate, and 0.002 parts of sodium thiosulfate were fed continuously into the apparatus.

The procedure consisted in heating the water and the components dissolved therein in a heat exchanger to 60°C and then spraying them through the opening 11 of the reactor onto the inner surfaces in the gas chamber. The vinyl chloride and the components dissolved therein were introduced continuously through the opening 10 of the top stage.

The speed of the blade stirrers were 250 rpm, corresponding to a velocity of flow in the ring conduits of 1.3 meters per second.

The reaction temperature was maintained at 55°C by 4 regulators each of which operates 5 stages.

After a mean stay period of 2.5 hours, the reaction mixture which had then attained a mean conversion of 85%, was withdrawn continuously from the opening 12. The unreacted monomer was separated. The water was centrifuged off, and the product was dried.

A PVC with a K-value (according to Fikentscher) of 68 and a grain distribution (according to Rosin-Rammler) with $n = 4.5$ and $d' = 210 \mu$ m was obtained. The bulk weight according to DIN 53,468 was 580 gm/1. The number of specks according to the Leuchs test (140°C) was 3 to 5/100 cm². During the processing in a planetary-type mixer, the product absorbs 50% of its weight in plasticizer within 3 minutes at 100°C, without losing its fluidity. The thermal stability of the product is good and corresponds to that of a PVC produced in batch operations.

After running for 4 weeks without interruption, the reactor was stopped, rinsed with water, and then filled with tetrahydrofuran. The latter was kept under rapid stirring for 3 hours at about 50°C. After removing the solvent, the reactor was again ready to use.

EXAMPLE 2

An apparatus corresponding to the drawings, but without blade stirrers on the continuous shaft was utilized. A mixture of 50 parts by weight of vinyl chloride, 50 parts of deionized water, 0.5 parts of sodium dodecyl-sulfate, 0.1 parts of dicetyl percarbonate, and 0.01 parts of sodium dithionite were introduced continuously through the opening 11. This mixture was first homogenized by continuous atomization at a differential pressure of 20 atm.

The speed of the shaft serving here as a stirrer was 100 rpm. The temperature of the reactor contents was kept at 50°C by 4 regulators.

After a mean stay period of 5 hours, the 95% reacted mixture was continuously withdrawn at the opening 12 as a thinly liquid latex. The remaining vinyl chloride was distilled off under vacuum, and the water was removed by filtration.

After drying, a PVC with a K-value of 70, a mean primary grain size of 0.6 $\mu$ m and a bulk weight of 380 gm/1 was obtained. The powder can be processed with the usual plasticizers to give low-viscosity pastes. For example, a paste with 40% dioctyl phthalate had a viscosity of 2200 cP at a shearing gradient of 50 sec$^{-1}$. The product can be readily foamed chemically and mechanically or be spread in films. It is also suitable for all other known uses of paste grade PVC produced according to the same formula, but discontinuously and with a polymerization of 25 hours with a correspondingly lower initiator charge.

EXAMPLE 3

33 parts by weight of methyl methacrylate, 66 parts by weight of deionized water, 0.43 parts by weight of a partially saponified polyvinyl acetate (30% residual acetate), 0.1 part by weight of lauroyl peroxide, 0.1 part by weight of dicetyl percarbonate and 0.01 part by weight of $Na_2S_2O_4$ were continuously charged into an apparatus as described in Example 1. The water and all the components soluble therein were continuously charged through the opening 11. The monomer and the materials soluble therein were introduced continuously through the opening 10 of the top stage.

The speed of the blade stirrer was 250 rpm. The temperature was maintained at 85°C in the first 15 stages and at about 120°C in the last 5 stages.

After a mean stay period of 1.5 hours, the reaction mixture was withdrawn continuously from the opening 12. The water was separated and the product was washed and dried.

The polymethyl methacrylate powder so obtained had an average particle size of 250 $\mu$ m. After a two week running time, the reactor was treated as in Example 1, but with acetone as the solvent.

EXAMPLE 4

An apparatus corresponding to the drawings and description with 10 stages all together was utilized. 100 parts by weight of isooctane was continuously passed into opening 11. 10 atmospheres of pressure of ethylene was continuously charged through another opening 11. Through opening 10 in the first stage, 0.08 parts of a catalyst (made from methyl-hydrogen-polysiloxane, 100 Ct. S., titanium tetrachloride and aluminum chloride, in isooctane) were continuously dosed in. Ethylene at a pressure of 10 atmospheres was charged through the openings 10 of the second, fourth and sixth stages.

The speed of the blade stirrer was 300 rpm. The temperature of the reactor was maintained at 75°C.

After a mean stay period of two hours (based on the isooctane charged), the reaction mixture was withdrawn continuously from opening 12 as a 30% suspension of polyethylene in isooctane.

A powder was recovered therefrom with the following characteristics:

| | |
|---|---|
| MFI 190/5 | = 2.7 |
| $\eta$ red | = 2.1 |
| Bulk weight | = 370 gm/l |
| Average particle size | = 280 $\mu$ m |

After running for six weeks, a thin polyethylene film had built up on the inner surfaces of the reactor which in no way hindered the polymerization. The condition under which a cleaning would become necessary was not reached in this period of time.

EXAMPLE 5

An apparatus corresponding to the drawings and description with 10 stages all together was utilized. 25 parts by weight of styrene, 75 parts by weight of deionized water, 0.5 part by weight of a 70% saponified polyvinyl acetate, 0.15 parts by weight of 2,2′-azo-bis-isobutyronitrile and 0.02 parts by weight of $Na_2S_2O_4$ was continuously passed into the apparatus. The water and the components soluble therein were added through the opening 11. The monomer and the compounds soluble therein were added through the opening 10 in the top stage.

The speed of the blade stirrer was 250 rpm. The temperature within the reactor was maintained at 70°C.

After a mean stay period of 5 hours, the reaction mixture, which had attained a 91% conversion, was continuously withdrawn from the opening 12. The water was separated and the product was dried under vacuum.

The polystyrene powder so obtained had an average particle size of 230 $\mu$ m. After running for two weeks, the reactor was cleaned as in Example 1 using toluene.

EXAMPLE 6

A three stage apparatus corresponding to the drawings and description was utilized. 100 parts by weight of acetaldehyde were continuously charged through the opening 11. 2.5 parts by weight of a 30% suspension of an aluminum ethylate mixed with $ZnCl_2$ were continuously passed through the opening 10 of the top stage and 0.5 parts by weight of the same suspension were continuously passed through the opening 10 of the second stage.

The velocity of flow in the ring conduits was adjusted to 0.5 meters per second and the temperature within the reactor was maintained at +5 °C.

After a mean stay period of 30 minutes (based on the aldehyde), the reaction mixture was continuously withdrawn from the opening 12. It still contained 1.5% of aldehyde. 90% of the raw esters so produced was again returned to the reaction through the opening 10 of the top stage of the reactor. 10% of the raw esters were withdrawn from the cyclic process and worked up.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. An apparatus for conducting chemical reactions, particularly polymerizations, continuously comprising substantially axially symmetrical central reaction chamber containing a plurality of vertically spaced substantially axially symmetrical separators dividing said central reaction chamber into a plurality of compartments, a rotatable shaft extending perpendicularly to said separators through each of said separators, means to rotate said rotatable shaft, small openings in said separators allowing a restricted flow of liquid between said plurality of compartments, at least three ring-shaped conduits, each rigidly mounted externally and in communication with one of said plurality of compartments by two unrestricted openings therein on substantially the opposite sides of said compartments, the volume of said ring conduits being from 50% to 90% of the total volume of said central reaction chamber and said ring conduits, and separate feeding and dispensing means in the topmost and bottommost of said plurality of compartments and in said ring-shaped conduits to receive and dispense fluids.

2. The apparatus of claim 1 wherein said small openings in said separators also provide an unrestricted shaft opening for said rotatable shaft to extend therethrough.

3. The apparatus of claim 1 wherein said ring-shaped conduits are provided with jackets designed to receive a temperature controlled liquid.

4. The apparatus of claim 1 wherein the average surface roughness of the inner surface of said apparatus is less than 10 $\mu$.

5. The apparatus of claim 4 wherein said average surface roughness is less than 1 $\mu$.

6. The apparatus of claim 1 wherein said rotatable shaft has agitator blades mounted thereon in each of said plurality of compartments.

7. The apparatus of claim 1 wherein said central reaction chamber is substantially circular, said rotatable shaft is mounted substantially in the center of said central reaction chamber and has agitator blades mounted thereon in each of said plurality of compartments.

8. The apparatus of claim 7 wherein each of said two unrestricted openings on substantially the opposite sides of said compartments are tangential in the direction of rotation of said rotatable shaft.

* * * * *